(12) United States Patent
Kumar et al.

(10) Patent No.: US 9,967,103 B2
(45) Date of Patent: May 8, 2018

(54) ADVISOR ROLES IN THE ELECTRONIC SIGNING OF DOCUMENTS

(71) Applicant: ADOBE SYSTEMS INCORPORATED, San Jose, CA (US)

(72) Inventors: Divij Kumar, New Delhi (IN); Neha Saxena, New Delhi (IN); Aditya Kumar Pandey, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 83 days.

(21) Appl. No.: 14/975,515

(22) Filed: Dec. 18, 2015

(65) Prior Publication Data

US 2017/0180133 A1    Jun. 22, 2017

(51) Int. Cl.
*H04L 29/06* (2006.01)
*H04L 9/32* (2006.01)

(52) U.S. Cl.
CPC .......... *H04L 9/3247* (2013.01); *H04L 9/3297* (2013.01); *H04L 63/0853* (2013.01)

(58) Field of Classification Search
CPC . H04L 9/3247; H04L 9/3297; H04L 2209/72; G06F 2221/2151
See application file for complete search history.

(56) References Cited

U.S. PATENT DOCUMENTS

2013/0318589 A1* 11/2013 Ford .................. H04L 63/08 726/7
2014/0019761 A1*  1/2014 Shapiro ............. H04L 9/3247 713/176

\* cited by examiner

*Primary Examiner* — Dao Q Ho
(74) *Attorney, Agent, or Firm* — Shook Hardy & Bacon L.L.P.

(57) ABSTRACT

In various implementations, an electronic signature platform implements an electronic signing workflow that includes receiving, from a signer device, annotations made by a signer role to an electronic document in response to a request to sign the electronic document. A reply is received, from an advisor device, is made by an advisor role and is responsive to the annotations. Based on providing the reply to the signer device, an electronic signature is received that is provided by the signer role in response to the request to sign the electronic document. An audit trail is maintained that includes descriptions for events associated with the electronic signature, and timestamps associated with the events. The annotations and the reply are recorded by one or more of the events.

18 Claims, 7 Drawing Sheets

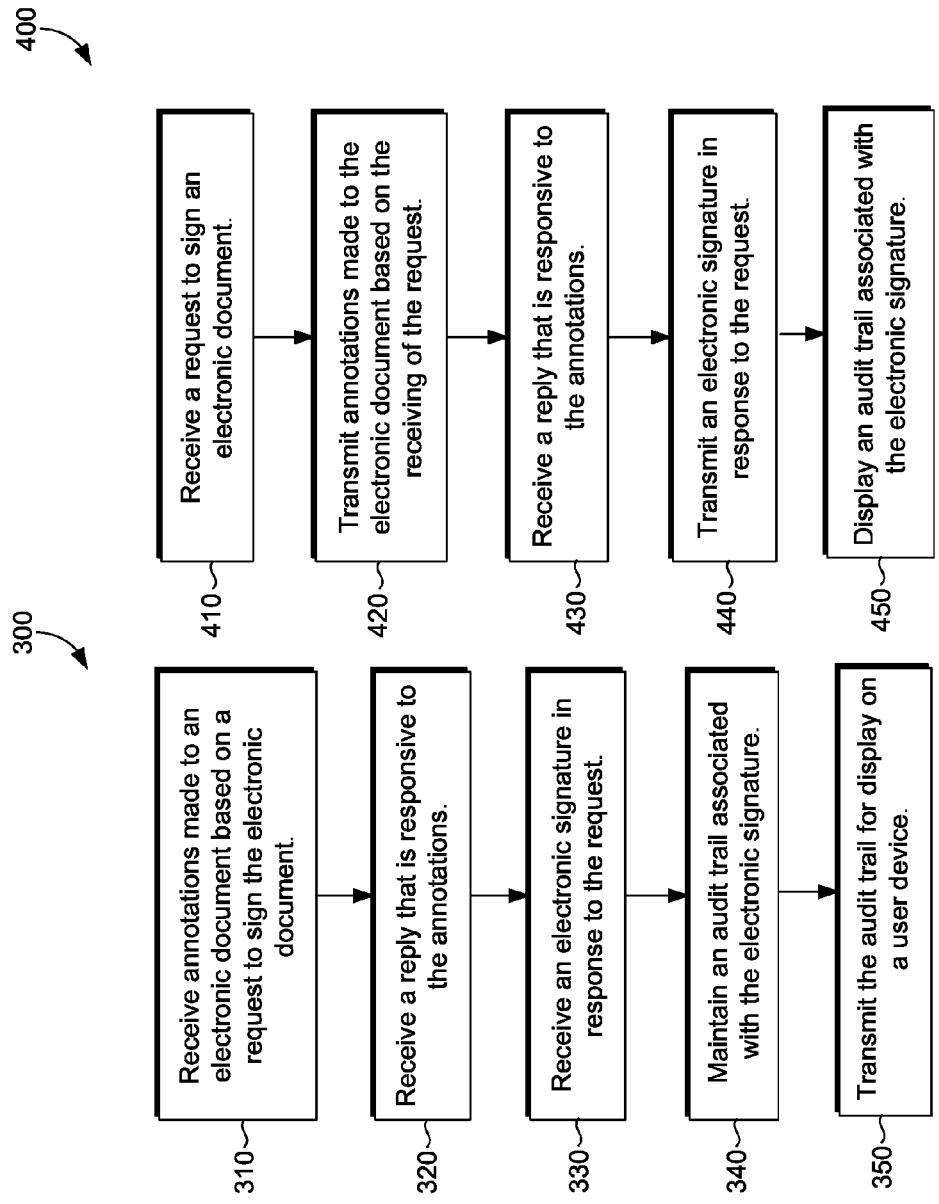

ADVISOR ROLES IN THE ELECTRONIC SIGNING OF DOCUMENTS

BACKGROUND

Electronic signing solutions, such as Adobe eSign, are available to facilitate the signing of electronic documents by way of electronic signature. A person's electronic signature often has significant legal and business ramifications. As such, the person may wish to seek advice from an attorney, a supervisor, and/or other counsel prior to applying their electronic signature to an electronic document. In order to seek counsel, a person may communicate with counsel outside of an electronic signing workflow, such as via e-mail or telephone. Information may be exchanged between the parties including physical and/or digital copies of the electronic document and related comments. One of the parties may wish to access this information at some point in the future, such as after the electronic document has been signed. However, much of the information exchanged between the parties is lost, obscure, or unreliable (e.g., due to the insecure and transitory nature of these communication channels).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to incorporating advisor roles into electronic signing workflows. In some respects, upon receiving a request to sign an electronic document, a signer role may select an option in an electronic signing application to provide comments to an advisor role for review prior to providing an electronic signature to the electronic document. The comments may be in the form of annotations to the electronic document and are provided to an electronic signing platform.

In further respects, the electronic signing platform provides the comments from the signer role to the advisor role, which may be by way of an e-mail notification with a link to an annotated version of the electronic document. The advisor role can respond to the comments from the signer role, such as by providing annotations to the electronic document. The advisor role provides the reply to the electronic signing platform, which in turn provides the reply to the signer role. The signer role can view the reply and optionally provide additional comments for review thereby starting a new comment and reply cycle via the electronic signing platform. As an alternative, the signer role may provide an electronic signature in response to the initial request to sign the electronic document.

In further respects, the electronic signing platform maintains an audit trail of the electronic signing workflow. The audit trail includes any annotations provided by signer roles and any replies provided by advisor roles in the electronic signing workflow. Thus, information exchanged between the roles is securely and accurately recorded. The electronic signing platform can enforce privacy restrictions with respect to the communications between signer roles and advisors roles. This can include refraining from providing sender roles indications of whether review has been requested by signer roles, the existence and/or identify of advisor roles involved in a review, and/or information exchanged between signer roles and advisor roles including comments and replies. Thus, for example, different users and/or roles may have access to different portions of the audit trail depending on privacy settings, rules, and/or permissions associated with the user. In some cases, signer roles may configure the privacy settings for the audit trail to allow or disallow users' access to the information exchanged with advisor roles.

BRIEF DESCRIPTION OF THE DRAWINGS

The present invention is described in detail below with reference to the attached drawing figures, wherein:

FIG. 3 is a flow diagram showing an example of a method for implementing an electronic signing workflow in accordance with implementations of the present disclosure;

FIG. 4 is a flow diagram showing an example of a method for implementing an electronic signing workflow in accordance with implementations of the present disclosure;

DETAILED DESCRIPTION

Figure 1:
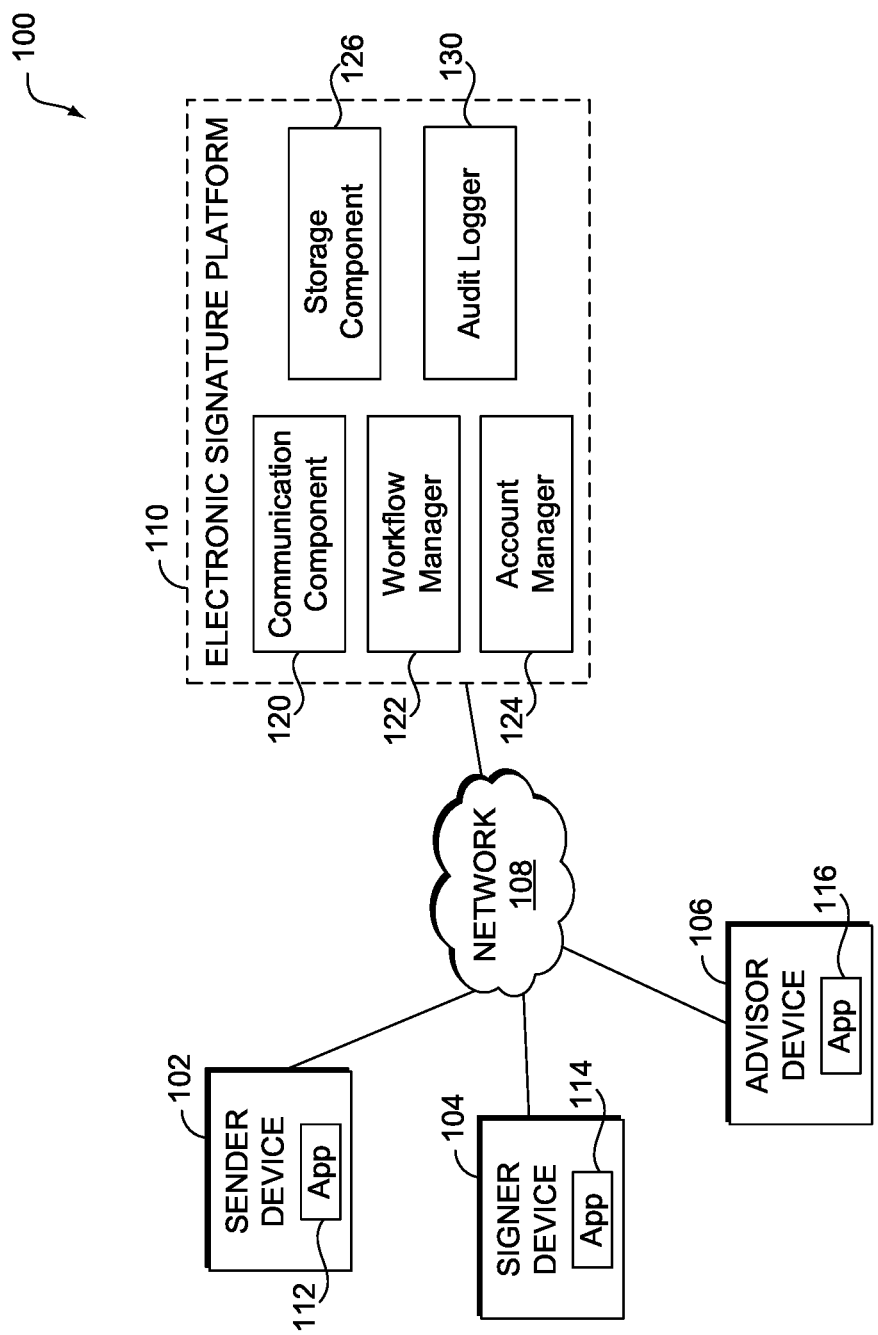
FIG. 1 is a diagram illustrating an example of a system in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Electronic signatures for signing electronic documents are becoming increasingly common. Examples of electronic documents include electronic mail, electronic copies/versions of contracts, a message sent via some cryptographic protocol, and an electronic version of a scanned paper document (e.g., an Adobe PDF®, image, or digital representation of a scanned contract or other physical document). Electronic signatures may or may not require that signatories use a smartcard, dongle, or public key infrastructure (PKI) to sign an electronic document (e.g., in which a user must have a digital certificate that has been issued to the user in order to digitally sign the document) or otherwise participate in an electronic signing workflow.

In an electronic signing workflow, security measures are taken to ensure the authenticity of users and to avoid forgery or tampering with user actions and communications in transit and while in storage during the electronic signing workflow. A person may wish to seek advice from an attorney, a supervisor, and/or other counsel prior to applying their electronic signature to an electronic document. In order to seek counsel, a person may communicate with counsel outside of an electronic signing workflow, such as via e-mail or telephone. Information may be exchanged between the parties including physical and/or digital copies of the electronic document and related comments. One of the parties may wish to access this information at some point in the future, such as after the electronic document has been signed. However, much of the information exchanged between the parties is lost, obscure, or unreliable (e.g., due to the insecure and transitory nature of these communication channels).

Implementations of the present disclosure provide for advisor roles in electronic signing workflows. One or more advisor roles can be incorporated into an electronic signing workflow to provide replies to comments from other roles, such as signer and/or sender roles. In this regard, advisor roles facilitate the secure and enduring exchange of information associated with an electronic signature.

As used herein, an "electronic signature" or "e-signature" generally refers to any electronic data that carries the intent of a signature. For example, an electronic signature can be any electronic data, such as a click-through (e.g., clicking an acceptance/agree button), a typed signature, a computer generated signature for a user, a scanned signature for a user, a voice recording, a finger swipe, a photo or video of a user, a biometric reading (e.g., finger print, iris scan, voice print, or another biometric measure), that indicates that a person adopts the contents of the electronic document (e.g., a contract, a message, or any other electronic document). Adobe eSign is one example of a commercial product for providing electronic signatures for electronic documents.

As used herein, a "role" refers to an internally defined identity and corresponding job functions (e.g., in an electronic signing platform). The electronic signing workflow may be implemented by controlling access through roles defined in an electronic signing platform, assigning permissions to those roles, and assigning users to those roles. Users of an electronic signing platform may refer to user accounts or identities, which may or may not be registered on the electronic signing platform. Unregistered users may become registered, allowing for additional services on the electronic signing platform.

An "advisor role" or "advisor" refers to a role in an electronic signing workflow that is responsible for reviewing one or more electronic documents that are the subject of an electronic signing workflow and for replying to communications that reference the electronic document(s) and are from at least one other role, such as a signer role or a sender role. The reply, when present, typically occurs prior to the signer providing an electronic signature(s) for the one or more electronic documents. In some implementations, the reply and/or review is not a prerequisite for the signer providing the electronic signature, even where review and/or reply has been requested by another role (i.e., a signer role may provide an electronic signature at any time).

A "sender role" or "sender" refers to a role in an electronic signing workflow that is responsible for requesting one or more electronic signatures for one or more electronic documents. A "signer role" or "signer" refers to a role in an electronic signing workflow that is responsible for providing at least one electronic signature for at least one electronic document in an electronic signing workflow.

In implementations, and at a high level, upon receiving a request to sign an electronic document, a signer role may select an option in an electronic signing application to provide comments to an advisor role for review prior to providing an electronic signature to the electronic document. The comments may be in the form of annotations to the electronic document and are provided to an electronic signing platform.

The electronic signing platform provides the comments from the signer role to the advisor role, which may be by way of an e-mail notification with a link to an annotated version of the electronic document. The advisor role can respond to the comments from the signer role, such as by providing annotations to the electronic document. The advisor role provides the reply to the electronic signing platform, which in turn provides the reply to the signer role. The signer role can view the reply and optionally provide additional comments for review thereby starting a new comment and reply cycle via the electronic signing platform. As an alternative, the signer role may provide an electronic signature in response to the initial request to sign the electronic document.

In some implementations, the electronic signing platform maintains an audit trail of the electronic signing workflow. As used herein, an "audit trail" or "audit log" refers to a security-relevant chronological record, set of records, and/or destination and source of records that provide documentary evidence of the sequence of activities that have affected at any time a specific operation, procedure, or event. An audit trail can include descriptions for a plurality of events associated with the signing on an electronic document, and a plurality of timestamps associated with the plurality of events. An event may generally correspond to the detection by the e-signing platform of a role carrying out a job function of the role. An audit trail may be used, for example, to determine or show that a given user or person associated with, for example, that user's e-mail address or login for an electronic signing platform, electronically signed a given electronic document, or otherwise performed some function in an electronic signing workflow. An audit trail can include various description such as an e-mail address with a link to the electronic document (or version thereof) and actions/events for each transaction including login and timestamp, clicked accept and timestamp, and possibly other actions/events.

The audit trail includes any comments or annotations provided by signer roles and any replies provided by advisor roles in the electronic signing workflow. Thus, information exchanged between the roles is securely and accurately recorded. The electronic signing platform can enforce privacy restrictions with respect to the communications between signer and advisor roles. This can include refraining from providing sender roles' (or other signer roles in a workflow when present) indications of whether review has been requested by a signer role, the existence and/or identity of advisor roles involved in a review, and/or information exchanged between the signer role and the roles counterpart advisor role(s) including comments and replies. Thus, for example, different users and/or roles may have access to different portions of the audit trail depending on privacy settings, rules, and/or permissions associated with the user (e.g., custom audit trails may be generated per specific user and/or role). In some cases, signer roles may configure the privacy settings for the audit trail to allow or disallow other users' access to the information exchanged with advisor roles.

By incorporating advisor roles into electronic signing workflows, the communications can be made in a secured and authenticated manner that is available in audit trail. Furthermore, in various implementations, an electronic signature platform maintains versions of the electronic document including replies and comments. Thus, storage and bandwidth consumption can be reduced where the electronic signature platform receives and/or stores differences between the versions, as opposed to complete copies of the electronic document for each version. For example, advisor roles can provide replies and/or signer roles can provide comments without transmitting the entire electronic document.

Additionally, in various implementations, the challenge of alerting parties in e-signing workflows with time sensitive information is addressed. For example, it is often important for electronic documents to be signed in a timely manner. By transmitting a notification to a user associated with a role (e.g., advisor roles and/or signer roles), a link can be provided that enables connection of an associated device to the electronic signing platform when the user comes online (e.g., via an application on the device). In some cases, the notification can result in an alert being displayed on the device (e.g., an e-mail or text message).

In further respects, the challenge of alerting parties in e-signing workflows when the identities and/or existence of parties are unknown is addressed. For example, a reminder notification may optionally be sent to an advisor role based on a reminder notification being requested by a sender role for a signer role. The reminder notification may be sent to the advisor role based on determining that the advisor role has failed to provide a reply to a request for review an electronic document from the signer role.

Turning now to FIG. 1, a diagram is provided illustrating an example of a system in accordance with implementations of the present disclosure. System 100 can be utilized to implement an electronic signing workflow. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes any number of sender devices, signer devices, and advisor devices, such as sender device 102, signer device 104, and advisor device 106, network 108, and electronic signature platform 110 (also referred to as "e-signature platform 110"). In some implementations, system 100 employs a client-server architecture, where the sender devices, signer devices, and advisor devices are client devices and e-signature platform 110 is implemented using one or more server devices. Any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 700, later described with reference to FIG. 7, for example. The components may communicate with each other via network 108.

Network 108 may be wired, wireless, or both. Network 108 may include multiple networks, or a network of networks, but is shown in simple form so as not to obscure aspects of the present disclosure. By way of example, network 108 can include one or more wide area networks (WANs), one or more local area networks (LANs), one or more public networks, such as the Internet, and/or one or more private networks. Where network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 108 is not described in significant detail.

In various implementations, sender device 102, signer device 104, and advisor device 106 are computing devices that are capable of accessing the Internet, such as the World Wide Web. The devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The devices can include one or more processors, and one or more computer-readable media. The computer-readable media may include computer-readable instructions executable by the one or more processors. The instructions may correspond to one or more applications, such as applications 112, 114, and 116 shown in FIG. 1. The applications may generally be any application capable of facilitating the exchange of information between the device and the electronic signing platform in carrying out the job functions of roles in an electronic signing workflow. In some implementations, the applications comprise web applications, which can run in a web browser. In addition, or instead, the applications can comprise dedicated applications, such as a document reader application. The applications on the devices may be utilized to communicate with e-signature platform 110 and/or receive input for e-signature platform 110 in order to implement an electronic signing workflow.

In some cases, e-signature platform 110 is a web based service providing a web site or other interface that users of the devices can interact with via the applications on those devices. Although a single application is shown for each device, in some cases, different applications may be utilized to facilitate different portions of the electronic signing workflow and/or different applications may work in conjunction to that effect.

FIG. 1 shows a functional block diagram of an example of an architecture for e-signature platform 110. As shown, e-signature platform 110 includes communication component 120, workflow manager 122, account manager 124, storage component 126, and audit logger 130.

Communication component 120 is configured to process and manage communications between e-signature platform 110 and client devices, such as sender devices, signer devices, and advisor devices over network 108. The communications can be part of an e-signing workflow, which is managed by workflow manager 122.

Workflow manager 122 is configured to manage e-signing workflows that facilitate the electronic signing of electronic documents using the various devices described above. An e-signing workflow typically includes a request for at least one electronic signature and the receipt at least one electronic signature based on the request. As described above, an e-signing workflow can include various roles that fulfill various defined duties or responsibilities in order to carry out the e-signing workflow.

In FIG. 1, sender device 102 may be employed to carry out a sender role, signer device 104 may be employed to carry out a signer role, and advisor device 106 may be employed to carry out an advisor role. It is noted that this notation is utilized for simplicity and clarity of disclosure in order to illustrate certain implementations of the disclosure. In many implementations, for example, multiple devices may be utilized to carry out a single role and different devices may be employed to carry out different portions and/or stages of the same e-signing workflow with respect to the role. A device may be referred to as a signer device, sender device, or advisor device where the device is associated with the designated role in an electronic signing workflow, such as by receiving user input and/or displaying information to facilitate one or more portions of the job functions of the role in the electronic signing workflow.

Account manager 124 is configured to provide for user account services in e-signature platform 110, which can be employed to associate users with roles in electronic signing workflows. For example, sender role may identify users for signer roles in an e-signing workflow, and signer roles may identify advisor roles for the e-signing workflow. Account manager 124 can maintain and enforce these associations on e-signature platform 110 over the course of a particular e-signing workflow. In this way, it can ensure that the proper users (and associated entities) are performing the proper job functions in a specific e-signing workflow. For example, only users identified for advisor roles may be permitted to provide replies and receive annotations that fulfill the job function of advisor roles over that specific e-signing workflow. The same user may be an advisor for one specific e-signing workflow and could be a signer or sender for another e-signing workflow. Account manager 124 can provide login and other account services for users of e-signature platform 110. Further, account manager 124 may collect and maintain user profile information, as described herein.

In some implementations account manager 124 and workflow manager 122 work in conjunction with communication component 120 to provide a notification service to the users. In particular, the notification service can provide e-mail, text, phone, and/or other notifications for e-signing workflows, as described herein.

Storage component 126 is configured to store any of the various information received or transmitted by e-signature platform 110. In some embodiments, storage component 126 stores content, such as one or more copies of an electronic document and/or versions thereof, annotations to the electronic, comments and/or replies made between roles, timestamps, events, audit trail information, and/or other information during and possibly after the electronic signing workflow process is completed (e.g., for archival of such transactions), as described herein.

Audit logger 130 is configured to track and maintain audit logs, or trails, of e-signing workflows. A separate audit log may be maintained for each e-signing workflow.

Figure 2A:
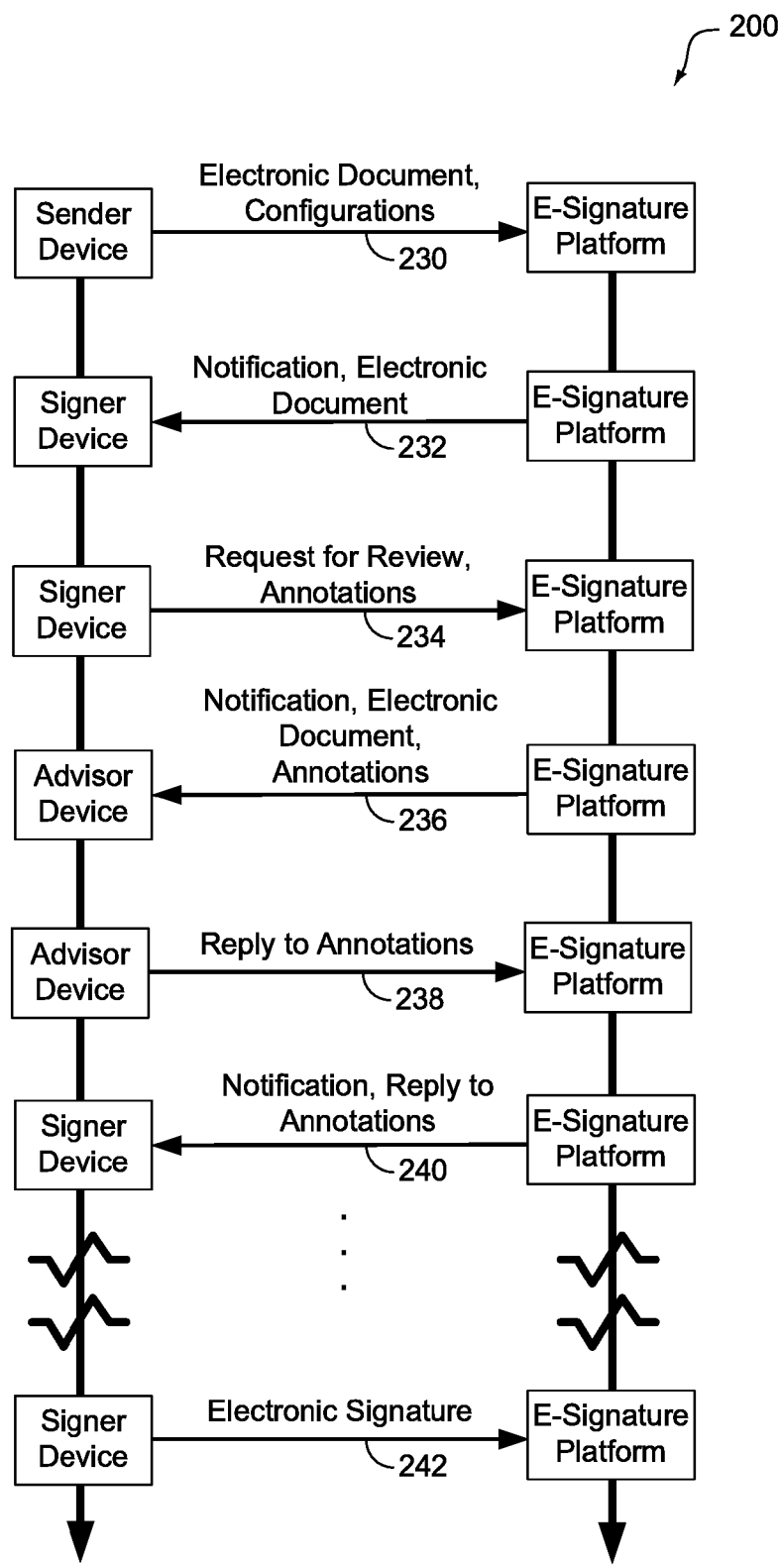
FIG. 2A illustrates a flow diagram of an example of an electronic signing workflow in accordance with implementations of the present disclosure.
Figure 2B:
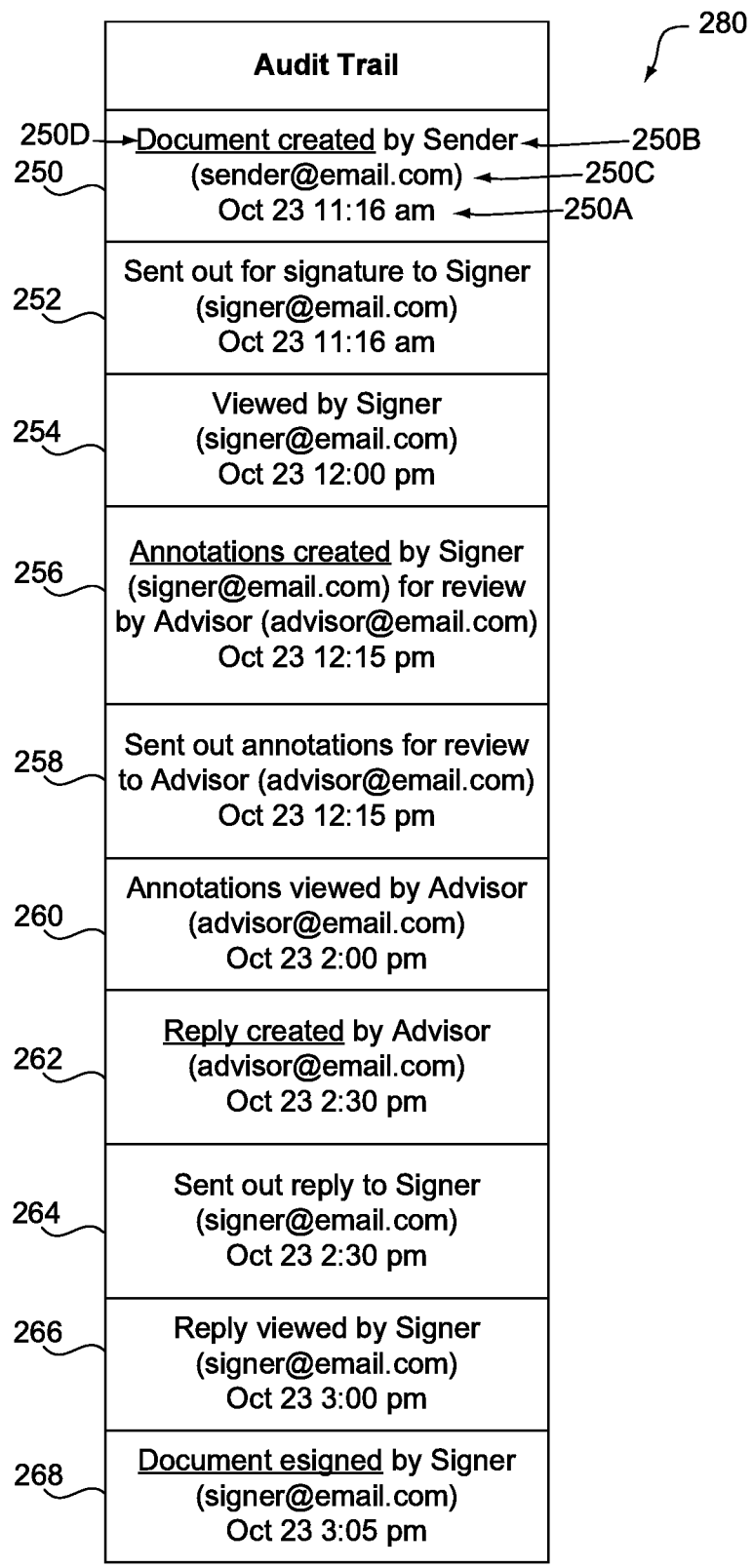
FIG. 2B illustrates an example of an audit trail of an electronic signing workflow in accordance with implementations of the present disclosure.

Typically, an e-signing workflow includes a sender role and one or more signer roles. As described above, in various implementations of the present disclosure, the e-signing workflow additionally incorporates one or more advisor roles. By incorporating advisor roles into electronic signing workflows, communications made between parties associated with advisor and signer roles can be made in a secured and authenticated manner that is available in audit trail. FIGS. 2A and 2B are utilized below to describe examples of electronic signing workflows that incorporate advisor roles and corresponding audit trails in accordance with implementations of the present disclosure.

FIG. 2A illustrates a flow diagram of an example of an electronic signing workflow in accordance with implementations of the present disclosure. In particular, FIG. 2A illustrates electronic signing workflow 200. FIG. 2B illustrates an example of an audit trail of an electronic signing workflow in accordance with implementations of the present disclosure. In particular, FIG. 2A illustrates audit trail 280 of electronic signing workflow 200. Sender devices in FIG. 2A can correspond, for example, to sender device 102 in FIG. 1. Signer devices in FIG. 2A can correspond, for example, to signer device 104 in FIG. 1. Advisor devices in FIG. 2A can correspond, for example, to advisor device 106 in FIG. 1. As examples above, these devices may be the same device or different devices throughout the different portions of electronic signing workflow 200. Also in FIG. 2A, the e-signing platform can correspond to e-signature platform 110 in FIG. 1.

In electronic signing workflow 200, a sender role can provide one or more communications 230 to the e-signature platform by way of an associated user. This can be accomplished, for example, through interaction with application 112 on sender device 102. These communications may be provided to initiate the electronic signing of one or more electronic documents. In some implementations, this includes the electronic document(s) to be signed. Furthermore, this can include any of various configurations for the e-signing workflow. For example, the signer role can identify each user to act as a signer role (e.g., by including their respective e-mail addresses). The signer role may further utilize these configurations to define various fields of the electronic documents(s), such as one or more signature fields or blocks, which may be designated for a particular user's signature. In the example shown, a single user has delegated a signer role by the sender role's configurations.

Referring to FIG. 2B, audit trail 280 includes a plurality of entries, of which entries 250, 252, 254, 256, 258, 260, 262, 264, 266, and 268 are shown. It is noted that any number of entries may correspond to a single event. Further, the events shown are merely examples. An event may generally correspond to the detection by the e-signing platform of a role carrying out a job function of the role. For example, entry 250 can be generated based on one or more communications 230 being received by the e-signing platform and corresponds to the event of the sender role creating the electronic document.

An entry can comprise a timestamp corresponding to the event. For example, timestamp 250A can correspond to entry 250 (e.g., a completion time of the event). As shown, each entry includes a corresponding timestamp.

An entry can further include one or more role identifiers. Role identifiers can identify one or more roles involved in the event. For example, entry 250 includes role identifier 250B, which identifies a sender role as completing the event.

An entry can further include one or more user identifiers. User identifiers can identify one or more users involved in the event. For example, entry 250 includes user identifier 250C, which identifies a user associated with the event (e.g., assigned to the sender role).

An entry can further include a link to information pertaining to the event. For example, entry 250 includes user link 250D, which links to the electronic document corresponding to the event (e.g., created by the sender role). It is noted that the link can generally be provided to any information pertinent to an event, such as information received from a role during the event. This can include, for example, annotations, replies, comments, questions, configurations, settings, and more. In addition, or instead, any of this various information may be stored and/or displayed directly in the entry of the audit trail.

Further shown in FIG. 2A, the e-signature platform can transmit a notification (e.g., a message) to each of the users via the notification services over one or more communications 232. As mentioned above, the notification can be an e-mail, text, phone, and/or other notifications. For example, notifications may be sent to one or more e-mail addresses provided by the sender over one or more communications 230 and/or to one or more e-mail addresses or other destinations associated with users designated as signers for the e-signing workflow. The notification can include a link to the electronic document and a body of text that explains the purpose and contents of the notification. For example, the notification may explain in text that a user associated with the sender role has requested that the user requested a signature for the linked document, and the user on a signer device may use the link to access the electronic document. This may cause application 114 to launch with the electronic document. Other notifications described herein may operate in a similar manner to provide access to the information provided by the electronic signing platform. The notifications are typically sent to a destination associated with the user assigned to the role (e.g., specified by another role, as described herein, and/or associated with the role in the electronic signing platform), such as an e-mail address, phone number, IP address, or other address. As shown, one or more communications 232 can further include the electronic document(s) provided by the sender role (e.g., linked in entry 250). Entry 252 in FIG. 2B corresponds to the sending out of the electronic document(s) for signature using one or more communications 232.

Notified parties may access the electronic document(s) on signer devices. For example, in some implementations a signer clicks on a link in the notification (e.g., e-mail), which causes the electronic document to be displayed in an application. (e.g., application 114 may be launched). This event may optionally be tracked using a viewing indicator from the signer device as indicated by entry 254 in audit trail 280.

In viewing the electronic document, a signer may choose to sign the electronic document. However, in accordance with implementations of the present disclosure, the signer can optionally request review and/or feedback from an advisor role prior to providing an electronic signature for an electronic document. In some implementations, this is accomplished by selecting an option in an electronic signing application, such as application 114 (e.g., the document used to view and sign the electronic documents). For example, the option could be selected explicitly, such as via a dropdown menu and/or checkbox. In some cases, the signer role specifies (e.g., using the application) one or more users to act in advisor roles. For example, the user may specify one or more user identifiers, such as e-mail addresses. It is noted that the users may or may not be registered on the e-signing platform. In some cases, the user enters or otherwise selects the user identifier. In other cases, one or more advisor roles may be preconfigured on the e-signing platform prior to or otherwise external to the e-signing workflow. In these cases, the system may automatically determine the advisor role(s) during the e-signing workflow.

As shown in FIG. 2A, the signer device can transmit the request for review to the electronic signing platform over one or more communications 234. Optionally, the signer role can provide one or more comments pertaining to the electronic document(s) to be signed that are designated for the review by the advisor role(s). Different comments may optionally be designated for different advisor roles, or all advisor roles may receive the same comments. The comments can include questions pertaining to the contents of the electronic document. In the implementation shown these comments are in the form of annotations. Annotations may be made, for example, by the user to the electronic document (e.g., using application 114). An annotation may refer to a form of comment that is referenced to or otherwise integrated into one or more portions of an electronic document. For example, the annotations for an electronic document can comprise mappings to one or more locations in the electronic document. Further the annotations may be embedded within the electronic document, or maintained separately. In some cases, the annotations are stored in metadata of the electronic document.

In some implementations, the user may specify a time limit for the review (e.g., in application 114) that may be transmitted over one or more communications 234. Based on the time limit, electronic signature platform may automatically send one or more reminder notifications to the user associated with the advisor role, which can be similar to any of the various notifications described herein.

Entry 256 corresponds to an event of the e-signing platform receiving comments and/or annotations from the signer role for review by an advisor role. Although receipt of the request for review and annotations are shown as a single entry, multiple entries and/or events could be employed. In some cases, receipt of the annotations from the signer role constitutes an implicit request for review. In some cases, the annotations are provided without providing the electronic document (e.g., via mappings of comments to the electronic document and the comments themselves). In others, the electronic document may be provided with the annotations. As shown, entry 256 includes a link to the annotations and/or comments from the signer role. Selecting the link may cause the annotated electronic document to be displayed to a user (e.g., in the app on the device). In this way, the annotated version of the electronic document may be stored and accessed during and/or after the electronic signing workflow. It is noted that in some cases, comments may be displayed in this manner without necessarily displaying the electronic document (e.g., non-annotated comments).

The e-signature platform can transmit a notification to the user or users designated with an advisor role via the notification services over one or more communications 236. For example, notifications may be sent to one or more e-mail addresses provided by the signer over one or more communications 234 and/or to one or more e-mail addresses or other destinations associated with users designated as advisors for the e-signing workflow. As shown, one or more communications 236 can further include the electronic document(s) and/or the annotations or comments from the signer role. Where different annotations and/or comments are designated for different advisor roles, the advisor roles may only be sent their designated annotations and/or comments for review.

Entry 258 in FIG. 2B corresponds to the sending out of the electronic document(s) and/or annotations for review using one or more communications 236. The entry includes a role identifier and user identifier corresponding to the role in the form of a destination address. Where multiple advisor roles are specified, each user identifier may be listed, either in the same entry or using multiple entries and/or events.

Notified users may access the electronic document(s) and/or annotations on advisor devices. For example, in some implementations an advisor clicks on a link in the notification (e.g., e-mail), which causes the electronic document to be displayed in an application with annotations (e.g., application 116 may be launched). In some cases, any comments may be viewed separate from the electronic document. The event of viewing annotations and/or comments may optionally be tracked using a viewing indicator from the advisor device as indicated by entry 260 in audit trail 280.

An advisor role can provide a reply to the comments (e.g., annotations) from the signer role. The reply may be generated by a user associated with the advisor role, for example, within the application launched via the notification. The reply is responsive to the comment from the signer role. In some cases, one or more annotations made by the signer role are individually addressable through the user interface of the application and linked to corresponding portions of the reply that address the individual annotations. As with the comments from the signer, the reply can be in the form of annotations to the electronic document. In another embodiment, an advisor role may elect to add new annotations that are unrelated to any prior annotations by signer. The reply and/or annotations from the advisor role may be stored in the electronic document with at least some of the comments from the signer role, or may be separate. Further, the reply may be transmitted to the electronic signing platform in a similar or different manner than the comments from the signer using one or more communications 238. Entry 262 corresponds to the reply or annotation being provided by the advisor role to the electronic signing platform. A separate entry may be included for each advisor role involved in the electronic signing workflow as they are created with associated time stamps. Entry 262 includes a link to the reply created by the advisor. A separate or shared link may be provided to access each reply from each advisor as it becomes available on the e-signature platform. Accessing the reply can, for example, cause the reply to be displayed in the application on the device and may further cause display of the electronic document with the reply. For example, annotations from the reply could be displayed on the electronic document.

The e-signature platform can transmit a notification to the user with the signer role via the notification services over one or more communications 240 based on a reply being received from an advisor role. A separate notification may be provided for each reply and/or advisor role involved in the e-signing workflow. For example, notifications may be sent to the destination provided by the sender or a different destination associated with the signer, such as one specified by the signer.

As shown, one or more communications 240 can further include the electronic document(s) and/or the reply from the advisor role(s). The reply or replies can be viewed by a user associated with a signer role in similar or different manners than what has been described above with respect to an advisor role viewing annotations from a signer. In some cases, the display indicates which portions of the reply correspond to which portions of the comments from the signer. Further the display may display visually distinguish between annotations from an advisor and annotations from a signer.

In some implementations, the user associated with the signer role can create a modified version of the electronic document that includes one or more replies and/or comments. For example, one or more replies or comments may be hidden, removed, or modified by the signer role. Further additional comments could be added by the signer. The additional comments could optionally be distinguished internally in the electronic document or metadata and visually in the application viewing the electronic document and when the electronic document is later viewed from the audit trail.

In some implementations, the signer role may select to send the modified electronic document to the sender role via the e-signing platform. Further, the sender role may optionally view and/or make comments on the modified electronic document. The sender role may further request review by an advisor role. As this process can be similar to the interaction between the signer role and advisor roles, it is not described in significant detail.

In further respects, the review process between the signer role and the advisor role may optionally continue using the modified electronic document or versions thereof, and/or new comments and/or annotations from the signer role. This can be similar to what has been described above with respect to one or more communications 234, 236, 238, and 240 and similar audit trail entries can be created and therefore is not described in significant detail.

It is further noted that rather than continuing the review, the signer role may opt to apply the electronic signature to the electronic document. For example, the signer role can use a signer device (e.g., the electronic signing application thereon, such as application 114) to provide the electronic signature. As with each communication between the application and/or devices and e-signature platform 110 during the e-signing workflow, this can be performed over a secure communication protocol, such as Transport Layer Security (TLS) or other secure communication protocols. As shown, one or more communications 242 can be employed to provide the electronic signature to the e-signature platform. Entry 268 in audit trail 280 is based on the event of the e-signature platform receiving the electronic signature. The entry includes a link to the electronic signature with the electronic document. As with comments and/or replies described above, the e-signature platform can embed the electronic signature(s) in the electronic document itself.

In some embodiments, the e-signature platform also digitally signs the electronic document, and/or any comments or replies for the electronic document so that the authenticity of the electronic document, the replies, and/or the comments can be ensured. Where different versions of the electronic document are maintained for different entries in the audit trail, each version may be digitally signed. As indicated above, the various information may be embedded in any combination of metadata of the electronic document, a body of the electronic document, or both the metadata and body of the electronic document. Typically, a single version of an electronic document with electronic signature(s) is maintained. An electronic signature may be a signature that carries the intent of a signature from a person that provides the signature as a user of an electronic device. The electronic signature may indicate that the signing party adopts the contents of the electronic document or one or more designated portions thereof. For the purposes of electronic signature, comments and replies or other annotations are excluded from the contents of the electronic document, although they may be viewed with the electronic document. However, comments and replies or other annotations may optionally be incorporated into the contents of the electronic document (e.g., explicitly by one or more roles prior to signature). E-signature platform 110 may include a certifying component, which uses a hardware security module (HSM) for storing digital certificates for the certifying service used to certify the electronic documents or other information (e.g., information tracked by the audit trail).

Although interaction between a single signer role and advisor role(s) has been described above, e-signing workflow 200 can incorporate any number of signer role and/or advisor roles. Each signer role may independently interact with one or more advisor roles similar to what has been described above. It is further noted that in some implementations, a signer role may opt to sign the electronic document any point after receiving the electronic document. Thus, for example, a signer role can provide an electronic signature after requesting review and prior to receiving a reply from an advisor role.

Although the e-signing platform may maintain audit trail 280 based on performances of job functions by each role involved in the e-signing workflow, different users of the e-signature platform may have different privileges and restrictions on what portions of audit trail 280 can be accessed and/or viewed by the user. For example, users associated with a signer role may receive, from the e-signature platform, for display on a signer device, entries of an audit trail that correspond to the request for review and associated comments and replies that they had with their respective advisor role(s) (e.g., entries 256, 258, 260, 262, 264, and 266). However, these entries may be made private or specific to a user or role with the sender role and/or advisor role(s) involved in the review process. Thus, the sender role, other signer roles, and/or advisor roles may be denied access to those entries. The signer role may optionally configure these privileges as desired to enable or disable access to various other users associated with a specific e-signature workflow. It is further noted that at least some of these privileges may be enforced at the electronic document level. For example, the electronic document may include comments and replies that are only accessible for viewing by users with viewing privileges. Thus, while two users may have access to the same entry and link therein, they may have different restrictions enforced in viewing the linked information with or without the electronic document.

Additional examples of methods are described below. Each block of the methods and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of an e-signing solution, such as the Adobe eSign.

Referring now to FIG. 3, FIG. 3 depicts a flow diagram of an example of a method (e.g., 300 in FIG. 3) for implementing an electronic signing workflow in accordance with implementations of the present disclosure. At block 310, the method includes receiving annotations made to an electronic document based on a request to sign the electronic document. For example, e-signature platform 110 (e.g., communication component 120) can receive, from signer device 104, annotations made by a signer role to an electronic document. The annotations may be drafted by a user associated with the signer role using application 114 and provided to e-signature platform 110 over one or more communications 234. The annotations can be drafted and provided in response to a request to sign the electronic document from e-signature platform 110. The request may have been made, for example, by a user associated with a sender role on sender device 102 using application 112 over one or more communications 230. The response can further correspond to a user selection of an option in an electronic signing application (e.g., application 114) to provide the annotations to an advisor role prior to responding to the request with an electronic signature.

At block 320, the method includes receiving a reply that is responsive to the annotations. For example, e-signature platform 110 (e.g., communication component 120) can receive, from advisor device 106, a reply made by the advisor role that is responsive to the annotations. The annotations may be provided to the advisor device based on the user selection of the option, for example over one or more communications 236. Further, a user associated with the advisor role can draft the reply and view the comments, for example, using application 116, which may also be used to communicate the information to e-signature platform 110.

At block 330, the method includes receiving an electronic signature in response to the request. For example, e-signature platform 110 (e.g., communication component 120) can receive the electronic signature provided by the signer role using the electronic signing application (e.g., application 114) in response to the request to sign the electronic document. The electronic signature can be provided by the electronic signing application over one or more communications 242. Further, the electronic signature can be received based on providing the reply to the signer device. For example, the user associated with the signer role may select a notification (e.g., click on a link therein) provided over one or more communications 240 to view the electronic document and reply in application 114. The user may then provide the electronic signature within the loaded electronic document. In other implementations, the user may opt to provide the electronic signature without viewing and/or receiving the reply, but potentially still after the reply has been provided to the signer device.

At block 340, the method includes maintaining an audit trail associated with the electronic signature. For example, e-signature platform 110 (e.g., audit logger 130 using storage component 126) can maintain audit trail 280 comprising descriptions for a plurality of events associated with the electronic signature, and a plurality of timestamps (e.g., timestamp 250A and others shown) associated with the plurality of events, as shown. The annotations made by the signer role and the reply made by the advisor role are recorded by one or more of the plurality of events (e.g., in entries 262 and 256) based on the receiving of the annotations and the receiving of the reply.

At block 350, the method includes transmitting the audit trail for display on a user device. For example, e-signature platform 110 (e.g., communication component 120) can transmit audit trail 280 (e.g., fully or one or more portions thereof) to signer device 104, sender device 102, advisor device 106, and/or other devices of a user associated with a role in e-signing workflow 200. In some cases, the transmitted audit trail is embedded in the electronic document and the electronic document is transmitted.

The transmitting may be based on one or more permissions associated with the user and/or role. As some examples, different users may be sent different versions and/or portions of the audit trail by e-signature platform 110 based on permissions associated with the user and/or role. E-signature platform 110 may provide portions (e.g., entries) of the audit trail to a user based on determining that the user has permissions to access or view those entries. Otherwise, the portions may be excluded from the audit trail sent to the user. For example, a user associated with an advisor role may be excluded from entries that correspond to other advisor roles based on permissions (e.g., comments from the signer and replies from advisors other than the present advisor may be withheld or filtered from the audit trail). As another example, users associated with the signer role may not be permitted to access or view entries corresponding to other signer roles and advisor roles (e.g., comments and replies). In some cases, a sender may be permitted to view an entry corresponding to comments and replies between signer and advisor roles, but not permitted to access or view the contents of the comments and/or replies. It is further noted that other signers may have similar permissions as the sender with respect to other signers. In other words, a signer may be restricted from accessing entries, comments, and/or replies corresponding to reviews from other signers. These and other scenarios are possible.

It is further noted that although transmission of the audit trail has been described above, permissions can be enforced on the user device. For example, the audit trail may contain any of the various information described above (e.g., be a complete audit trail). However, a user may be restricted from accessing or viewing the information based on the permissions. Thus it will be appreciated that many different forms of rights management can be employed in various implementations in order to restrict which users view and/or access various portions of the audit trail. In some implementations, a signer role is given privileges by e-signature platform 110 to grant and/or deny access and/or viewing privileges to other roles and/or users identified by the signer role for entries, comments, and/or replies made for one or more review requests initiated by that specific user associated with signer role.

Applications 112, 114, and 116 are examples of applications that may be utilized to access the audit trail and optionally display the audit trail on corresponding devices (and access information from the links therein for display on the device). Audit trail 280 can be transmitted and viewed any time during e-signing workflow 200 and/or after e-signing workflow 200 concludes. E-signing workflow 200 may conclude, for example, after all requested signatures are received, after the sender role cancels one or more requests for signature, and/or after the sender role otherwise opts to end the e-signing workflow 200, or under other conditions. Closing e-signing workflow 200 may cause closing of audit trail 280, thereby restricting modification to the audit trail.

Referring now to FIG. 4, FIG. 4 depicts a flow diagram of an example of a method (e.g., 400 in FIG. 4) for implementing an electronic signing workflow in accordance with implementations of the present disclosure. At block 410, the method includes receiving a request to sign an electronic document. For example, signer device 104 may receive, from electronic signature platform 110, a request for a signer role associated with signer device 104 to sign an electronic document. The request may be provided, for example, via the notification over one or more communications 232 and may be from the sender role.

At block 420, the method includes transmitting annotations made to the electronic document based on the receiving of the request. For example, based on the receiving of the request, signer device 104 can transmit to electronic signature platform 110, annotations made to the electronic document by the signer role (e.g., using application 114). The transmitting can be based on a selection of an option in an electronic signing application (e.g., application 114) to provide the annotations to an advisor role prior to responding to the request with an electronic signature. The transmitting may correspond to one or more communications 234 and may optionally identify a particular user and/or destination address thereof for the review in an advisor role.

At block 430, the method includes receiving a reply that is responsive to the annotations. For example, signer device 104 can receive, from electronic signature platform 110, a reply made by the advisor role that is responsive to the annotations. This reply may be received over one or more communications 240.

At block 440, the method includes transmitting an electronic signature in response to the request. For example, signer device 104 can transmit, to electronic signature platform 110, the electronic signature in response to the request to sign the electronic document. The electronic signature can be provided using the electronic signature application (e.g., application 114) after displaying the reply in association with the signer role (e.g., in application 114).

At block 450, the method includes displaying an audit trail associated with the electronic signature. For example, signer device 104 can receive the audit trail from e-signature platform 110 and display one or more portions of audit trail 280 (e.g., in application 114). The audit trail can be displayed at any time during or after e-signing workflow 200, and can appear as shown in FIG. 2B.

Figure 5:
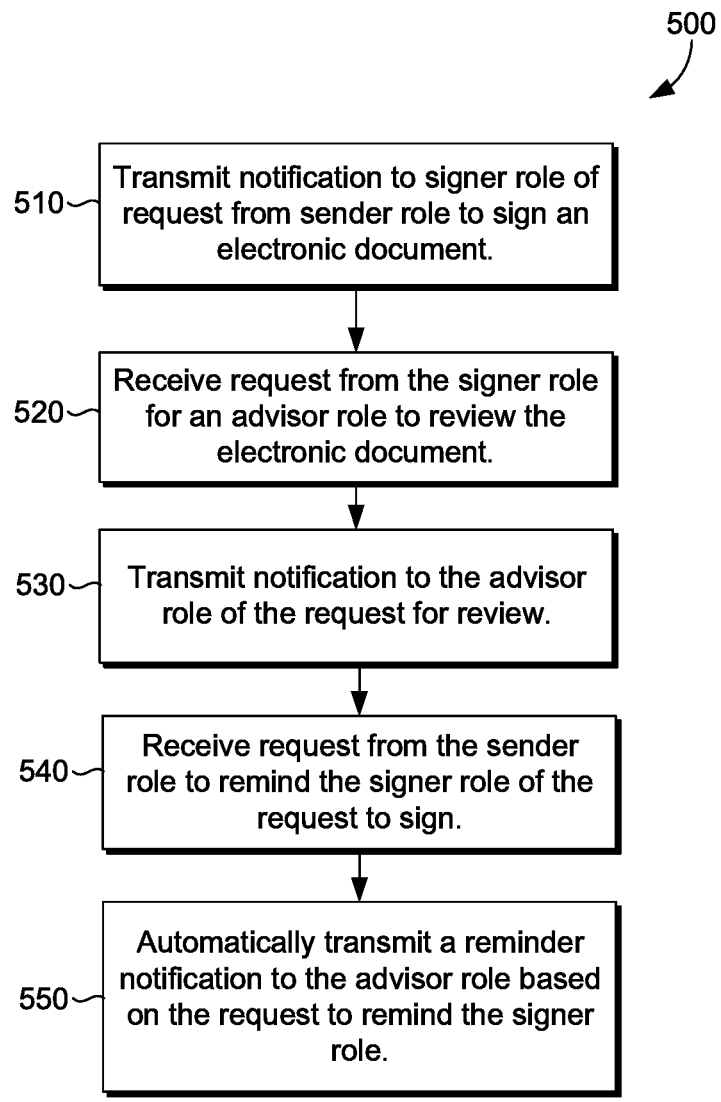
FIG. 5 is a flow diagram showing an example of a method for implementing an electronic signing workflow in accordance with implementations of the present disclosure.

Referring now to FIG. 5, FIG. 5 depicts a flow diagram of an example of a method (e.g., 500 in FIG. 5) for implementing an electronic signing workflow in accordance with implementations of the present disclosure. At block 510, the method includes transmitting a notification to a signer role of a request from a sender role to sign an electronic document. For example, e-signature platform 110 can transmit the request to signer device 104 over one or more communications 232.

At block 520, the method includes receiving a request from the signer role for an advisor role to review the electronic document. For example, e-signature platform 110 can receive the request from signer device 104 over one or more communications 234.

At block 530, the method includes transmitting a notification to the advisor role of the request for review. For example, e-signature platform 110 can transmit the notification to advisor device 106 over one or more communications 236.

At block 540, the method includes receiving a request from the sender role to remind the signer role of the request to sign. For example, a user may use application 112 on sender device 112 to create the request and send the request to e-signature platform 110. This may occur, for example, after e-signature platform 110 receives the request for review from the signer role. As another example, the request could be preconfigured by the sender role, such as by specifying a time or other conditions for the request to occur (e.g., remind the sender two-days after the notification is sent out).

At block 550, the method includes automatically transmitting a reminder notification to the advisor role based on the request to remind the signer role. For example, e-signature platform 110 may automatically transmit a reminder notification to the advisor role (e.g., to advisor device 106) based on the request from the sender role to remind the signer role. The notification service can be employed to provide the notification. The notification may further be based on a failure by the advisor role to provide a reply to annotations from the signer role or otherwise response to a request for review of the electronic document. Thus, for example, the notification may be sent to the advisor role where the reminder is scheduled by the sender role to occur between one or more communications 234 and one or more communications 238 in FIG. 2A, but may not be sent to the advisor role where the reminder is scheduled to occur after one or more communications 240. In other words, the notification may only be sent where the advisor role has failed to fulfill an outstanding requested review of the electronic document, but could otherwise be withheld based on the advisor role responding to a request for review.

In various implementations, the sender role may not be aware that the signer role has requested review of the electronic document. For example, for legal or privacy and security reasons, e-signature platform 110 may provide no indication of the existence and/or identity of any advisor roles with the signer role and/or interactions therewith. By automatically transmitting a reminder notification to any advisor role(s) that the sender has requested review from, e-signing workflows can be expedited while maintaining privacy and security. Contents of the reminder notification may indicate that the signer role is awaiting review of the electronic document. A reminder notification may optionally also be sent to the signer role (a copy of the reminder notification to the advisor or a separate notification) in any of the various scenarios described above based on the request from the sender role. The reminder notification to the advisor role may also be referred to as a cascading reminder notification which may occur without explicit instruction from any user or role apart from the sender role requesting the reminder.

Figure 6:
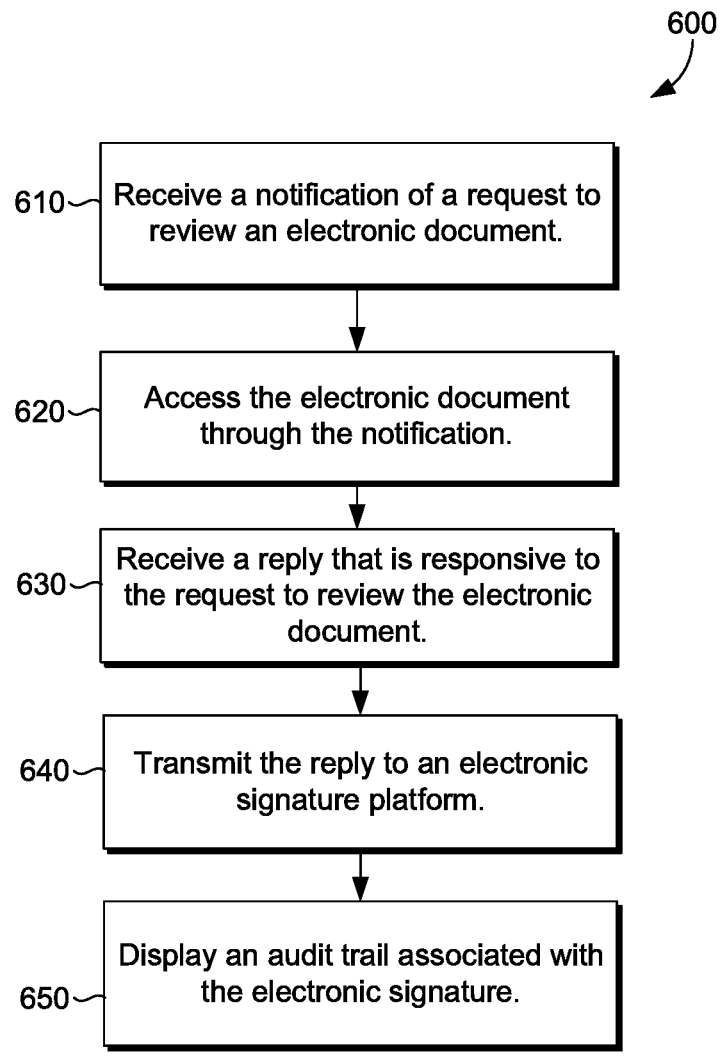
FIG. 6 is a flow diagram showing an example of a method for implementing an electronic signing workflow in accordance with implementations of the present disclosure.

Referring now to FIG. 6, FIG. 6 depicts a flow diagram of an example of a method (e.g., 600 in FIG. 6) for implementing an electronic signing workflow in accordance with implementations of the present disclosure. At block 610, the method includes receiving a notification of a request to review an electronic document. For example, advisor device 106 may receive, from electronic signature platform 110, a request for an advisor role associated with advisor device 106 to advise on an electronic document that a sender/signer is supposed to sign. The request may be provided, for example, via the notification over one or more communications 236 and may be from the signer role. As an example, the notification may be in the form of a text message, an e-mail message, and/or a push notification sent to an address associated with the advisor role (e.g., identified by the signer role in requesting review).

At block 620, the method includes accessing the electronic document through the notification. For example, the notification may optionally include a link that provides access to the electronic document. By selecting (e.g., clicking on) the link, advisor device 106 may be cause to establish a secure connection (e.g., with electronic signing platform 110) and receive the electronic document over the connection to access the document. This secure connection can also correspond to one or more communications 236 in FIG. 2A (e.g., over a different communication than the notification). As an alternative, the electronic document could be included in the notification, or otherwise accessed by a user associated with the advisor role, via a secure connection or interface. As shown, advisor device 106 may further receive comments and/or annotations made by the signer role. These can be provided in the electronic document, separate from the electronic document, in the notifications, or in another suitable and secure manner. In some cases, clicking on the link in the notification causes application 116 to launch with the electronic document and comments from the signer role. The comments may be displayed in the application as annotations on the electronic document.

At block 630, the method includes receiving a reply that is responsive to the request to review the electronic document. For example, advisor device 106 can receive, from a user of the device, the reply. The reply may be received via application 116. For example, the user associated with the advisor role can draft the reply within application 116 (e.g., while the document and annotations are displayed from block 620). The user can provide the reply as annotations to the electronic document and application 116 may identify those annotations as advisor role annotations on disk, such that they can be distinguished from signer role annotations.

At block 640, the method includes transmitting the reply to an electronic signature platform. For example, advisor device 106 can transmit, to electronic signature platform 110, the reply in response to the request to review the electronic document. The reply can be provided using application 116 (e.g., after the user of advisor device 106 selection an option to submit the reply). The reply may be transmitted over one or more communications 238. As with each communication shown in FIG. 2A, this can be a secure and encrypted communication. It is further noted that where application 116 is at least partially hosted on or connected to electronic signature platform 110, the reply (e.g., similar to comments and annotations from signer roles) may be provided to electronic signature platform 110 as it is being drafted. In this case, the option to submit the reply acts to indicate to electronic signature platform 110 completion of drafting the reply (e.g., enabling it to be provided to the signer role).

At block 650, the method includes displaying an audit trail associated with the electronic signature. For example, advisor device 106 can receive the audit trail from e-signature platform 110 (over one or more secure communications) and display one or more portions of audit trail 280 (e.g., in application 116). The audit trail can be displayed at any time during or after e-signing workflow 200, and can appear as shown in FIG. 2B.

Figure 7:
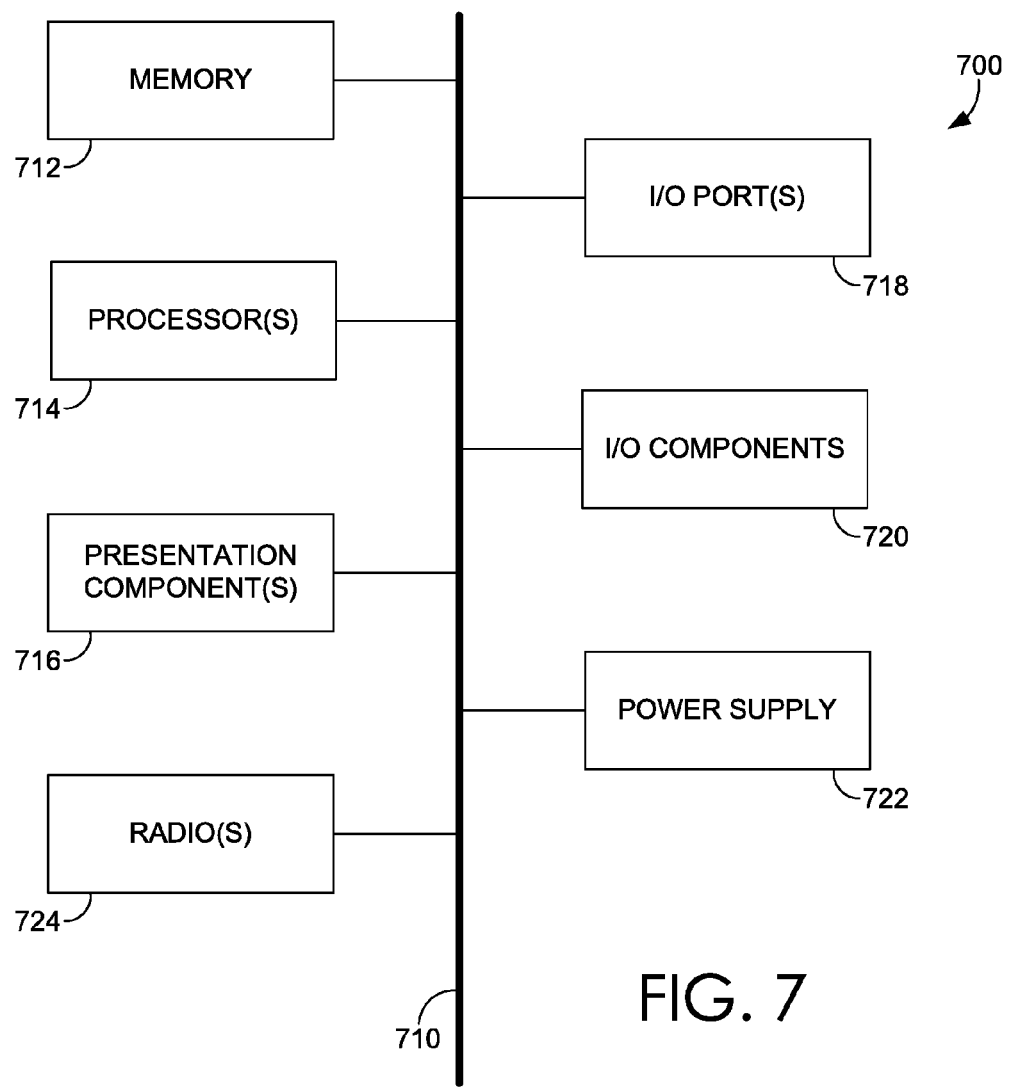
FIG. 7 is a block diagram of an example of a computing environment suitable for use in implementations of the present disclosure.

Having described implementations of the present disclosure, an example of an operating environment in which embodiments of the present invention may be implemented is described below in order to provide a general context for various aspects of the present disclosure. Referring initially to FIG. 7 in particular, an example of an operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code or circuits that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an example of a computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Examples of hardware devices include solid-state memory, hard drives, optical-disc drives, etc. Computing device 700 includes one or more processors that read data from various entities such as memory 712 or I/O components 720. Presentation component(s) 716 present data indications to a user or other device. Examples of presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As described above, implementations of the present disclosure provide for reducing the number of requests required for streaming multimedia content to client devices. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented system for implementing an electronic signing workflow comprising:
an electronic signature platform that maintains a plurality of predefined roles comprising a signer role and an advisor role, each role having a different set of permitted job functions enforced in electronic signing workflows, the electronic signature platform comprising one or more processors and memory, coupled with the one or more processors, having executable instructions embodied thereon, which, when executed by the one or more processors cause the electronic signature platform to:
receive, from a signer device, annotations made by a first user identity based on the first user identify having the signer role, the annotations made to an electronic document in response to a request to sign the electronic document, the response corresponding to a user selection by the first user identity of an option in an electronic signing application to request review by the advisor role prior to the first user identity responding to the request with an electronic signature;

receive a user made assignment of a second user identity to the advisor role;

receive, from an advisor device, a reply made by the second user identity that is responsive to the annotations and the requested review, the annotations provided to the advisor device based on the user selection of the option and based on the second user identity having the advisor role;

based on providing the reply to the first user identity, receive the electronic signature provided by the first user identity using the electronic signing application in response to the request to sign the electronic document; and maintain an audit trail comprising descriptions for a plurality of events associated with the electronic signature, and a plurality of timestamps associated with the plurality of events, one or more of the plurality of events recording the annotations made by first user identity and the reply made by the second user identity based on the receiving of the annotations and the receiving of the reply, wherein the electronic signature platform is further caused to:

receive, from a third user identity, the request to sign the electronic document based on the third user identity having the sender role;

based on the third user identity having the sender role, receive, a request from the third user identity to remind the first user identity of the request to sign the electronic document; and automatically transmit a reminder notification to the second user identity based on determining that the second user identity has failed to provide the reply, based on the second user identity having the advisor role, and further based on the user selection of the option.

2. The computer-implemented system of claim 1, wherein the electronic signature platform is further caused to receive, from a third user identity having a sender role, the request to sign the electronic document, the third user identity assigning the first user identity to the sender role based on the third user identity having the sender role.

3. The computer-implemented system of claim 1, wherein the audit trail comprises one or more links to the annotations and the reply.

4. One or more computer storage media having a plurality of executable instructions embodied thereon, which, when executed by one or more processors, cause the one or more processors to perform a method comprising:

maintaining, by an electronic signature platform, a plurality of predefined roles comprising a signer role and an advisor role, each role having a different set of permitted job functions enforced in electronic signing workflows;

providing a request to a signer device for a first user identity to sign an electronic document based on the first user identify having the signer role;

receiving, from the signer device, annotations made by the first user identify to the electronic document;

receive a first user made assignment of a second user identity to the advisor role;

receiving, from an advisor device, a reply that is responsive to the annotations, the reply made by the second user identity based on being assigned to the advisor role;

receiving an electronic signature provided by the first user identify based on the first user identity having the signer role, the electronic signature being in response to the request to sign the electronic document after providing the reply to the signer device; and in response to a request from the first user identity, transmitting an audit trail to the signer device comprising one or more descriptions and one or more timestamps corresponding to the annotations made by the first user identity and the reply made by the second user identity based on the receiving of the annotations and the receiving of the reply, wherein the electronic signature platform is further caused to:

receive, from a third user identity, the request to sign the electronic document based on the third user identity having the sender role;

based on the third user identity having the sender role, receive, a request from the third user identity to remind the first user identity of the request to sign the electronic document; and automatically transmit a reminder notification to the second user identity based on determining that the second user identity has failed to provide the reply, based on the second user identity having the advisor role, and further based on the user selection of the option.

5. The one or more computer storage media of claim 4, wherein the method further comprises receiving, from a third user identity having a sender role, the request to sign the electronic document, the third user identity assigning the first user identity to the sender role based on the third user identity having the sender role.

6. The one or more computer storage media of claim 4, wherein the audit trail comprises one or more links to the annotations and the reply.

7. The one or more computer storage media of claim 4, wherein reply comprises annotations made by the second user identity to the electronic document in response to the annotations made by the signer role to the electronic document.

8. The one or more computer storage media of claim 4, wherein the method further comprises in response to a request from a third user identity and based on the first user identity having a sender role, transmitting the audit trail to the first user identity, wherein the first user identity is denied access to the annotations and the reply based on one or more permissions associated with the sender role.

9. The one or more computer storage media of claim 4, wherein the annotations and the reply are embedded within one or more versions of the electronic document.

10. The one or more computer storage media of claim 4, wherein the method further comprises receiving, from the signer device, an identifier of the second user identity to act as the advisor role for review of the annotations prior to the receiving of the electronic signature.

11. The one or more computer storage media of claim 4, wherein the method further comprises transmitting, to the second user identity based on the second user identity having the advisor role, a notification of a user selection of an option, by the first user identity, to provide the annotations to the advisor role for review prior to the receiving of the electronic signature, the notification comprising a user selectable link to the annotations.

12. A computer-implemented method for implementing an electronic signing workflow, the method comprising:
receiving, from an electronic signature platform, a request for a first user identity a signer role to sign an electronic document based on the first user identify having a signer role, wherein the electronic signature platform includes a plurality of predefined roles comprising the signer role and an advisor role, each role having a different set of permitted job functions enforced in electronic signing workflows;
based on the receiving of the request, transmitting to the electronic signature platform, annotations made by the first user identify to the electronic document by the signer role, the transmitting based on a user selection of an option in an electronic signing application to request review by the advisor role prior to the first user identify responding to the request with an electronic signature, wherein the request includes a user made assignment of the second user identify to the advisor role;
receiving, from the electronic signature platform, a reply made by the second user identity that is responsive to the annotations and the requested review based on the second user identity having the advisor role;
transmitting, to the electronic signature platform, the electronic signature in response to the request to sign the electronic document, the electronic signature provided using the electronic signing application after displaying the reply to the first user identify based on the first user identify having the signer role; and
displaying, on a signer device associated with the first user identity, an audit trail from the electronic signature platform, the audit trail comprising one or more descriptions and one or more timestamps corresponding to the annotations made by the first user identity and the reply made by the second user identity based on the transmitting of the annotations and the selection of the option,
wherein the electronic signature platform is further caused to:
receive, from a third user identity, the request to sign the electronic document based on the third user identity having the sender role;
based on the third user identity having the sender role, receive, a request from the third user identity to remind the first user identity of the request to sign the electronic document; and
automatically transmit a reminder notification to the second user identity based on determining that the second user identity has failed to provide the reply, based on the second user identity having the advisor role, and further based on the user selection of the option.

13. The computer-implemented method of claim 12, further comprising transmitting, to the electronic signature platform, a destination address that identifies the second user identity to act as the advisor role.

14. The computer-implemented method of claim 12, further comprising:
receiving a user selection of a link in the displayed audit trail; and
in response to the user selection of the link, displaying a version of the electronic document that includes the reply as annotations to the electronic document.

15. The computer-implemented method of claim 12, wherein the annotations correspond to a first event in the plurality of events having a first timestamp in the displayed audit trail and the reply corresponds to a second event of the plurality of events having a second timestamp in the displayed audit trail, each event recording complication of a respective job function of the different set of permitted job functions of a role.

16. The computer-implemented method of claim 12, wherein the transmitting, to the electronic signature platform, the electronic signature in response to the request to sign the electronic document, is based on the first user identity having the signer role and accessing the reply.

17. The computer-implemented method of claim 12, wherein multiple sets of annotations to the electronic document are transmitted to the electronic signing platform, and multiple sets of replies are received from the electronic signing platform that are responsive to corresponding sets of the annotations, the multiple sets of annotations and the multiple sets of replies being recorded by one or more of the plurality of events based on the selection of the option.

18. The computer-implemented method of claim 12, further comprising:
based on the receiving of the request, transmitting to the electronic signature platform, additional annotations made to the electronic document by the first user identity based on the first user identity having the signer role, the transmitting being for additional review prior to responding to the request with the electronic signature;
wherein the transmitting, to the electronic signature platform, of the electronic signature occurs without the additional review from the advisor role, and the additional annotations made by the signer role are recorded by one or more of the plurality of events in the audit trail based on the transmitting of the additional annotations and the selection of the option.

* * * * *